(12) United States Patent
Xu et al.

(10) Patent No.: US 12,407,046 B2
(45) Date of Patent: Sep. 2, 2025

(54) END COVER ASSEMBLY, ENERGY STORAGE APPARATUS, AND ELECTRICITY-CONSUMPTION DEVICE

(71) Applicant: Hithium Tech HK Limited, Kowloon (HK)

(72) Inventors: Weidong Xu, Guangdong (CN); Yongfeng Xiong, Guangdong (CN); Feng Wang, Guangdong (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 0 days.

(21) Appl. No.: 18/392,273

(22) Filed: Dec. 21, 2023

(65) Prior Publication Data

US 2024/0274928 A1    Aug. 15, 2024

(30) Foreign Application Priority Data

Feb. 9, 2023 (CN) .......................... 202310091034.5

(51) Int. Cl.
*H01M 50/15* (2021.01)
*H01M 50/103* (2021.01)
*H01M 50/176* (2021.01)
*H01M 50/184* (2021.01)
*H01M 50/188* (2021.01)
*H01M 50/553* (2021.01)

(52) U.S. Cl.
CPC ......... *H01M 50/15* (2021.01); *H01M 50/103* (2021.01); *H01M 50/176* (2021.01); *H01M 50/184* (2021.01); *H01M 50/188* (2021.01); *H01M 50/553* (2021.01)

(58) Field of Classification Search
None
See application file for complete search history.

(56) References Cited

FOREIGN PATENT DOCUMENTS

| CN | 207199688 U | 4/2018 |
|---|---|---|
| CN | 207265118 U | 4/2018 |

(Continued)

OTHER PUBLICATIONS

WIPO, International Search Report and Written Opinion for International Application No. PCT/CN2023/075276, Jul. 13, 2023, 12 pages.

(Continued)

*Primary Examiner* — Jonathan G Leong
*Assistant Examiner* — Tony S Chuo
(74) *Attorney, Agent, or Firm* — Hodgson Russ LLP

(57) ABSTRACT

An end cover assembly, an energy storage apparatus, and an electricity-consumption device are provided in the disclosure to improve a production yield. The end cover assembly includes a top cover, an upper plastic member, a conductive block, a terminal post, and a sealing member. A mounting hole of the top cover extends through the top cover in a thickness direction of the top cover. The upper plastic member is mounted to the top cover. A through hole of the upper plastic member extends through the upper plastic member in the thickness direction of the upper plastic member and is in communication with the mounting hole. The conductive block is mounted to the upper plastic member. A fitting hole of the conductive block extends through the conductive block in a thickness direction of the conductive block and is in communication with the through hole.

20 Claims, 10 Drawing Sheets

(56) References Cited

FOREIGN PATENT DOCUMENTS

| | | |
|---|---|---|
| CN | 207338516 U | 5/2018 |
| CN | 207896134 U | 9/2018 |
| CN | 208722933 U | 4/2019 |
| CN | 209709074 U | 11/2019 |
| CN | 209804723 U | 12/2019 |
| CN | 113823868 A | 12/2021 |
| CN | 114156579 A | 3/2022 |
| CN | 114628822 A | 6/2022 |
| CN | 216958251 U | 7/2022 |
| CN | 115425345 A | 12/2022 |
| CN | 115425346 A | 12/2022 |
| CN | 218005055 U | 12/2022 |
| EP | 3367494 A1 * | 8/2018 ............ H01M 10/48 |
| JP | 2019175690 A | 10/2019 |

OTHER PUBLICATIONS

CNIPA, First Office Action for corresponding Chinese Patent Application No. 202310091034.5, Apr. 14, 2023, 16 pages.
CNIPA, Second Office Action for corresponding Chinese Patent Application No. 202310091034.5, Apr. 27, 2023, 16 pages.
CNIPA, Notice of Allowance for corresponding Chinese Patent Application No. 202310091034.5, Jul. 1, 2023, 10 pages.
EPO, Extended European Search Report issued in corresponding European Patent Application No. 23218224.6, Jul. 5, 2024, 11 pages.

* cited by examiner

END COVER ASSEMBLY, ENERGY STORAGE APPARATUS, AND ELECTRICITY-CONSUMPTION DEVICE

CROSS-REFERENCE TO RELATED APPLICATION(S)

This application claims priority under 35 U.S.C. § 119(a) to Chinese Patent Application No. 202310091034.5, filed Feb. 9, 2023, the entire disclosure of which is incorporated herein by reference.

TECHNICAL FIELD

The disclosure relates to the field of energy storage technologies, and in particular, to an end cover assembly, an energy storage apparatus, and an electricity-consumption device.

BACKGROUND

In existing energy storage apparatuses (for example, secondary batteries), a sealing member, an upper plastic member, and a lower plastic member are generally arranged between a terminal post and a top cover to achieve sealing. However, the terminal post and a conductive block will be subjected to relatively large external forces during riveting, and the sealing member easily loosens, thereby reducing the sealing performance between the terminal post and the top cover, and lowering a production yield of the energy storage apparatuses.

SUMMARY

According to a first aspect, an end cover assembly applicable to a battery cell is provided in the disclosure. The end cover assembly includes a top cover, an upper plastic member, a conductive block, a terminal post, and a sealing member. The top cover defines a mounting hole. The mounting hole extends through the top cover in a thickness direction of the top cover. The upper plastic member is mounted on the top cover. The upper plastic member defines a through hole extending through the upper plastic member in a thickness direction of the upper plastic member and being in communication with the mounting hole. The conductive block is mounted on the upper plastic member. The conductive block defines a fitting hole. The fitting hole extends through the conductive block in a thickness direction of the conductive block and is in communication with the through hole. The conductive block includes a protruding ring. The protruding ring is disposed on the conductive block and surrounds an inner wall of the fitting hole. The protruding ring abuts against the upper plastic member. The terminal post includes a flange portion and a post portion. The post portion is disposed on a top side of the flange portion. The post portion extends through the mounting hole, the through hole, and the fitting hole and is fixedly connected to the conductive block. The sealing member is sleeved on the post portion and clamped between the post portion and a wall of the mounting hole. A top surface of the sealing member abuts against a bottom surface of the upper plastic member, and a bottom surface of the sealing member abuts against a top surface of the flange portion.

According to a second aspect, an energy storage apparatus is provided in the disclosure. The energy storage apparatus includes a housing and the end cover assembly provided in any one of the above embodiments, the end cover assembly is mounted on a top side of the housing.

According to a third aspect, an electricity-consumption device is provided in the disclosure. The electricity-consumption device includes the above-mentioned energy storage apparatus, and the energy storage apparatus is configured to power the electricity-consumption device.

BRIEF DESCRIPTION OF THE DRAWINGS

To describe the technical solutions in the embodiments of the disclosure more clearly, the following describes the accompanying drawings for describing embodiments of the disclosure.

Figure 1:
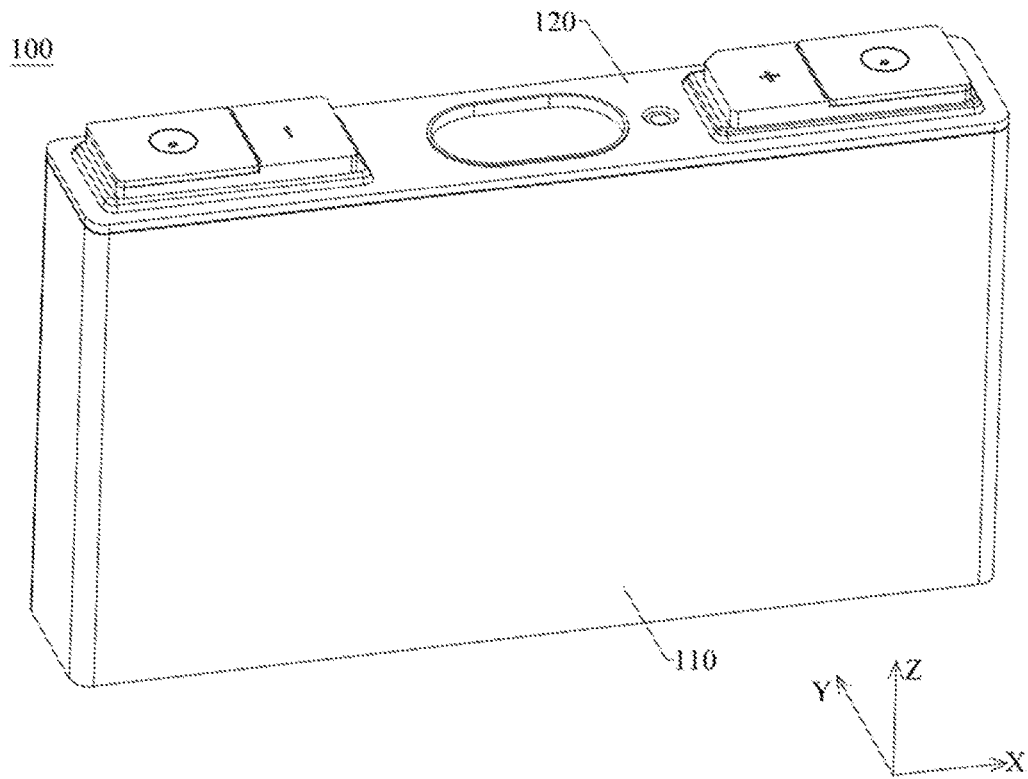
FIG. 1 is a schematic structural view of an energy storage apparatus according to embodiments of the disclosure.

Reference numbers in the accompanying drawings are described as follows:

energy storage apparatus 100, housing 110, end cover assembly 120, lower plastic member 10, top cover 20, explosion-proof valve 30, positive-electrode deformation member 40, negative-electrode deformation member 50, positive-electrode unit 60, negative-electrode unit 70, explosion-proof grid 11, first electrolyte injection hole 101, first avoidance groove 102, second avoidance groove 103, third mounting hole 104, fourth mounting hole 105, explosion-proof hole 201, second electrolyte injection hole 202, first mating hole 203, second mating hole 204, first mounting hole 205, second mounting hole 206, first upper plastic member 61, first conductive block 62, first terminal post 63, first sealing member 64, first connector 65, first mounting portion 611, first mating portion 612, first fitting groove 613, first avoidance hole 614, first identification through-hole 615, first groove top surface 616, first groove bottom surface 617, identification portion 611*a*, first mounting groove 618, first through hole 619, first extension portion 621, first welding portion 622, first top surface 623, first bottom surface 624, first protruding ring 622a, second top surface 625, second bottom surface 626, first fitting hole 627, first fitting portion 628, first connecting portion 629, first flange portion 631, first post portion 632, first sealing portion 641, first secondary sealing portion 642, second upper plastic member 71, second conductive block 72, second terminal post 73, second sealing member 74, second connector 75, second mounting portion 711, second mating portion 712, second fitting groove 713, second avoidance hole 714, second identification through-hole 715, second groove top surface 716, second groove bottom surface 717, second mounting groove 718, second through hole 719, second extension portion 721, second welding portion 722, third top surface 723, third bottom surface 724, second protruding ring 722a, fourth top surface 725, fourth bottom surface 726, second fitting hole 727, second fitting portion 728, second connecting portion 729, second flange portion 731, second post portion 732, second sealing portion 741, second secondary sealing portion 742, electricity-consumption device 1.

DETAILED DESCRIPTION

The following clearly describes the technical solutions in the embodiments of the disclosure with reference to the accompanying drawings in the embodiments of the disclosure.

An end cover assembly, an energy storage apparatus, and an electricity-consumption device are provided in the disclosure to achieve an improved production yield.

According to a first aspect, an end cover assembly applicable to a battery cell is provided in the disclosure. The end cover assembly includes a top cover, an upper plastic member, a conductive block, a terminal post, and a sealing member. The top cover defines a mounting hole. The mounting hole extends through the top cover in a thickness direction of the top cover. The upper plastic member is mounted on the top cover. The upper plastic member defines a through hole extending through the upper plastic member in a thickness direction of the upper plastic member and being in communication with the mounting hole. The conductive block is mounted on the upper plastic member. The conductive block defines a fitting hole. The fitting hole extends through the conductive block in a thickness direction of the conductive block and is in communication with the through hole. The conductive block includes a protruding ring. The protruding ring is disposed on the conductive block and surrounds an inner wall of the fitting hole. The protruding ring abuts against the upper plastic member after assembly. The terminal post includes a flange portion and a post portion. The post portion is disposed on a top side of the flange portion. The post portion extends through the mounting hole, the through hole, and the fitting hole and is fixedly connected to the conductive block. The sealing member is sleeved on the post portion and clamped between the post portion and a wall of the mounting hole. A top surface of the sealing member abuts against a bottom surface of the upper plastic member, and a bottom surface of the sealing member abuts against a top surface of the flange portion.

In embodiments of the disclosure, a ratio of a thickness of the protruding ring to a height of the protruding ring ranges from 0.2 to 0.8.

In embodiments of the disclosure, a height of the protruding ring ranges from 0.1 mm to 1.2 mm.

In embodiments of the disclosure, a thickness of the protruding ring ranges from 0.2 mm to 2.4 mm.

In embodiments of the disclosure, the sealing member includes a sealing portion and a secondary sealing portion. The secondary sealing portion is positioned on a bottom of the sealing portion and surrounds the sealing portion. The sealing portion is sleeved on the post portion and clamped between the post portion and the wall of the mounting hole of the top cover.

A surface of the sealing portion that faces away from the secondary sealing portion abuts against the upper plastic member. A surface of the secondary sealing portion that faces away from the sealing portion abuts against the top surface of the flange portion.

In embodiments of the disclosure, the conductive block includes a fitting portion and a connecting portion. The connecting portion is disposed on a top side of the fitting portion and extends outwards relative to a peripheral surface of the fitting portion to form the protruding ring. The upper plastic member covers the peripheral surface of the fitting portion.

In embodiments of the disclosure, the upper plastic member defines a mounting groove, and the fitting portion is received in the mounting groove.

In embodiments of the disclosure, the through hole is in communication with the mounting groove, the fitting hole extends through the fitting portion and the connecting portion, and the protruding ring is disposed on a surface of the fitting portion away from the connecting portion.

In embodiments of the disclosure, the upper plastic member includes a mounting portion and a mating portion fixedly connected to one side of the mounting portion. The mounting portion defines a fitting groove and an identification through-hole. An opening of the fitting groove is defined on a surface of the mounting portion facing towards the mating portion. The fitting groove is in communication with the mounting groove. An opening of the identification through-hole is defined on a top surface of the mounting portion, and the identification through-hole is in communication with the fitting groove. The mating portion defines the mounting groove and the through hole. The conductive block includes an extension portion and a welding portion. The welding portion is fixedly connected to one side of the extension portion. The extension portion is mounted to the fitting groove. A top surface of the extension portion covers the identification through-hole. The extension portion is different from the mounting portion in color. The welding portion includes the fitting portion and the connecting portion. The welding portion is received in the mounting groove.

In embodiments of the disclosure, the fitting groove includes a groove top surface and a groove bottom surface opposite the groove top surface. The top surface of the extension portion abuts against the groove top surface. A bottom surface of the extension portion abuts against the groove bottom surface.

In embodiments of the disclosure, a top surface of the welding portion protrudes relative to the top surface of the mounting portion.

In embodiments of the disclosure, a surface of the mounting portion facing towards the mating portion is spaced from an outer peripheral surface of the welding portion.

In embodiments of the disclosure, the end cover assembly includes a positive-electrode unit and a negative-electrode unit. The positive-electrode unit and the negative-electrode unit are both mounted to the top cover and are arranged at intervals. The negative-electrode unit includes one upper plastic member, one conductive block, one terminal post, and one sealing member. The positive-electrode unit includes one upper plastic member, one conductive block, one terminal post, and one sealing member.

According to a second aspect, an energy storage apparatus is provided in the disclosure. The energy storage apparatus includes a housing and the end cover assembly provided in any one of the above embodiments, the end cover assembly is mounted on a top side of the housing.

According to a third aspect, an electricity-consumption device 1 is provided in the disclosure. The electricity-consumption device 1 includes the above-mentioned energy storage apparatus, and the energy storage apparatus is configured to power the electricity-consumption device 1.

FIG. 1 is a schematic structural view of an energy storage apparatus 100 according to the embodiments of the disclosure. For ease of illustration, a length direction of the energy storage apparatus 100 is defined as an X-axis direction, a width direction of the energy storage apparatus 100 is defined as a Y-axis direction, a height direction of the energy storage apparatus 100 is defined as a Z-axis direction. The X-axis direction, the Y-axis direction, and the Z-axis direction are perpendicular to each other.

The energy storage apparatus 100 includes a housing 110, a jelly-roll (not illustrated), and an end cover assembly 120. The housing 110 has an opening (not illustrated) and an accommodation cavity (not illustrated). The jelly-roll is accommodated in the accommodation cavity. The accommodation cavity is also configured for accommodating an electrolyte, and the jelly-roll is soaked in the electrolyte. The end cover assembly 120 is mounted on a top side of the housing 110 and seals the opening. Exemplarily, the energy storage apparatus 100 may be a prismatic battery. In other embodiments, the energy storage apparatus 100 may also be a cylindrical battery or other batteries.

It may be noted that, directional terms such as "top", "bottom", "left", and "right" in the disclosure are described with reference to orientations illustrated in FIG. 1. "Top" is defined as facing a positive direction of the Z-axis. "Bottom" is defined as facing a negative direction of the Z-axis. "Right" is defined as facing a positive direction of the X-axis. "Left" is defined as facing a negative direction of the X-axis. The above terms do not explicitly or implicitly indicate that apparatuses/devices or components referred to must have a certain orientation, be configured or operated in a certain orientation, and therefore are not limitations on the disclosure.

Figure 2:
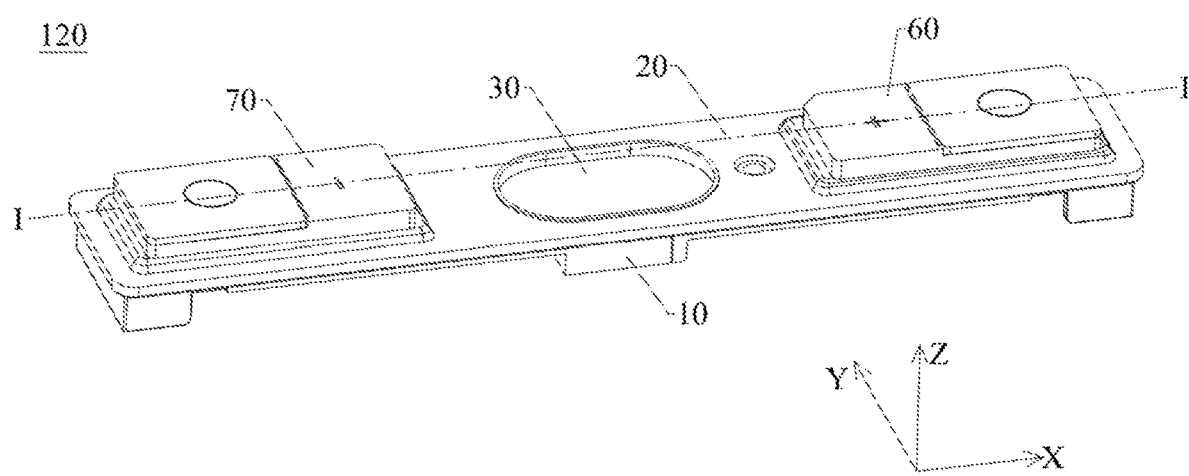
FIG. 2 is a schematic structural view of an end cover assembly of the energy storage apparatus illustrated in FIG. 1.
Figure 3:
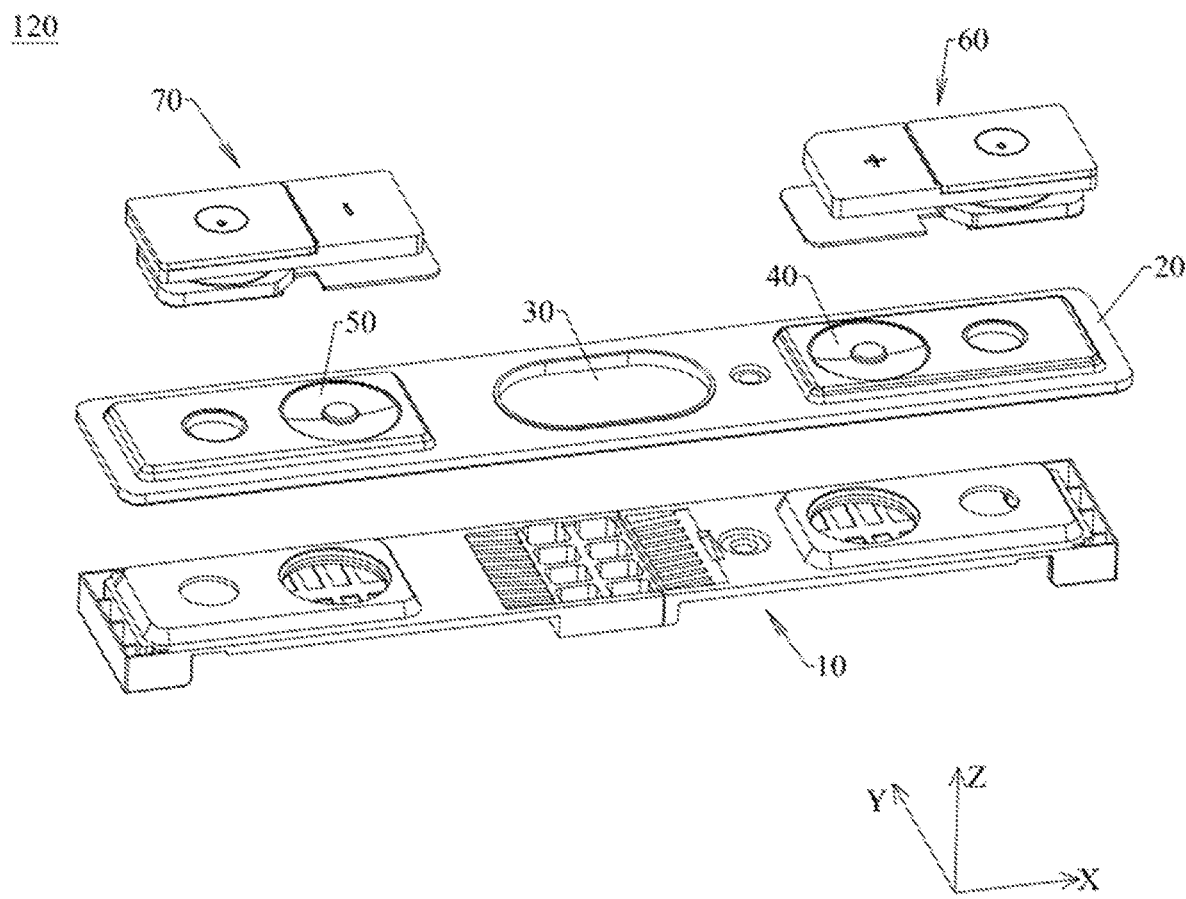
FIG. 3 is a schematic exploded structural view of the end cover assembly illustrated in FIG. 2.
Figure 4:
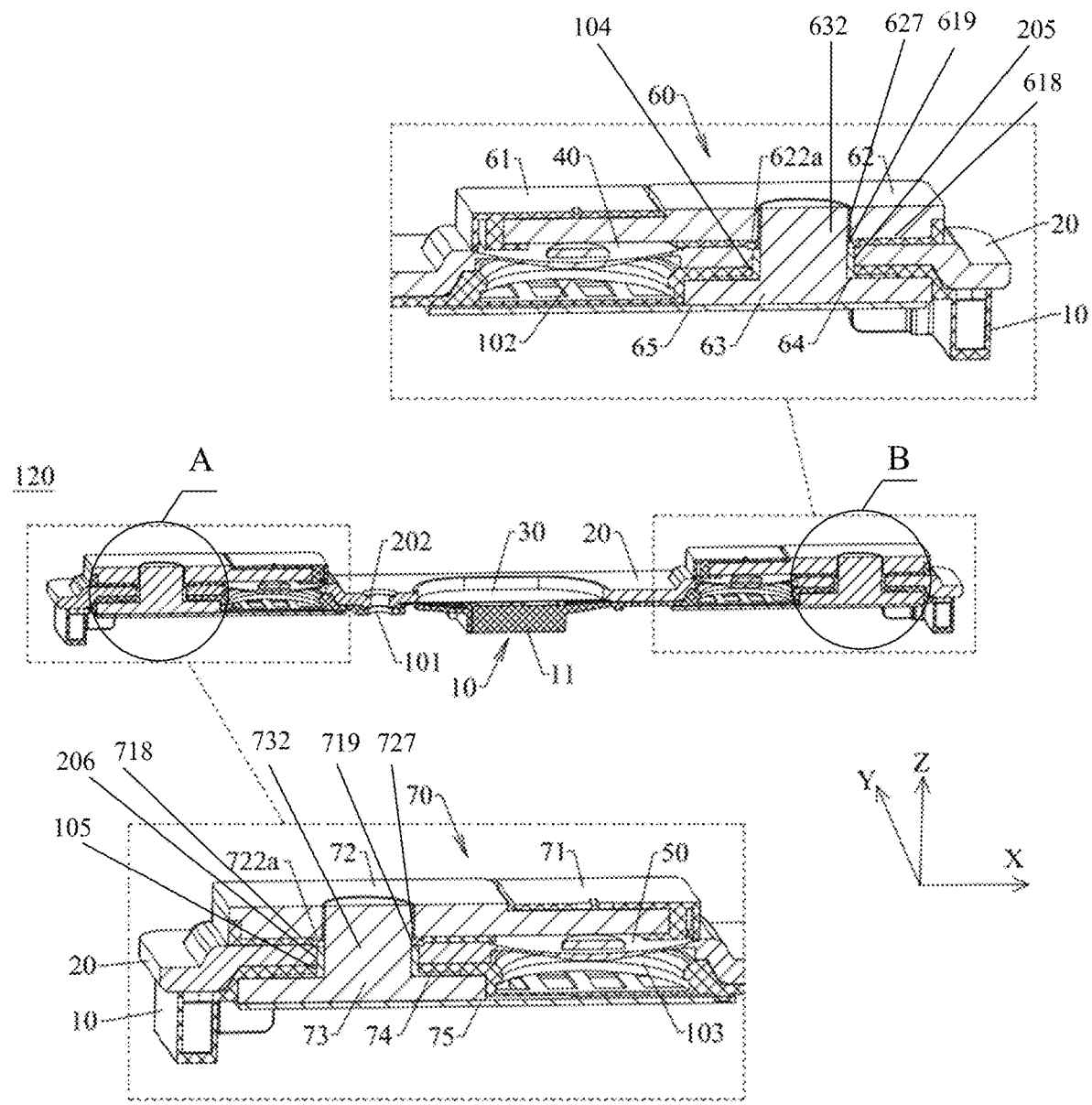
FIG. 4 is a schematic cross-sectional structural view of the end cover assembly illustrated in FIG. 2, taken along line I-I.

As illustrated in FIGS. 2 to 4, FIG. 2 is a schematic structural view of the end cover assembly 120 of the energy storage apparatus 100 illustrated in FIG. 1, FIG. 3 is a schematic exploded structural view of the end cover assembly 120 illustrated in FIG. 2, and FIG. 4 is a schematic cross-sectional structural view of the end cover assembly 120 illustrated in FIG. 2, taken along line I-I. "Taken along line I-I" refers to cut along a plane where line I-I is positioned. Similar illustrations hereinafter may be interpreted in the same manner.

The end cover assembly 120 includes a lower plastic member 10, a top cover 20, an explosion-proof valve 30, a positive-electrode deformation member 40, a negative-electrode deformation member 50, a positive-electrode unit 60, and a negative-electrode unit 70. The top cover 20 is mounted on a top side of the lower plastic member 10. The explosion-proof valve 30, the positive-electrode deformation member 40, and the negative-electrode deformation member 50 are all mounted to the top cover 20. The positive-electrode deformation member 40 and the negative-electrode deformation member 50 are positioned at two opposite sides of the explosion-proof valve 30, respectively. The positive-electrode deformation member 40 and the negative-electrode deformation member 50 are both spaced apart from the explosion-proof valve 30. The positive-electrode unit 60 and the negative-electrode unit 70 are both mounted to the top cover 20, and are positioned at opposite sides of the explosion-proof valve 30, respectively. The positive-electrode unit 60 and the positive-electrode deformation member 40 are positioned at the same side of the explosion-proof valve 30. The positive-electrode unit 60 covers the positive-electrode deformation member 40. The negative-electrode unit 70 and the negative-electrode deformation member 50 are positioned at the same side of the explosion-proof valve 30. The negative-electrode unit 70 covers the negative-electrode deformation member 50.

Both the positive-electrode deformation member 40 and the negative-electrode deformation member 50 are configured to deform in response to an increase in a pressure inside the energy storage apparatus 100. When a gas pressure inside the energy storage apparatus 100 exceeds a preset pressure threshold value, the positive-electrode deformation member 40 can deform to be in contact with a conductive block of the positive-electrode unit 60 so that the positive-electrode unit 60 is short-circuited externally, and the negative-electrode deformation member 50 can deform to be in contact with a conductive block of the negative-electrode unit 70 so that the negative-electrode unit 70 is short-circuited externally. As a result, a large short-circuit current is generated to cause a phenomenon of fusing and top-cutting at the positive-electrode deformation member 40 and a bottom of the conductive block of the positive-electrode unit 60 so that the positive-electrode deformation member 40 is open-circuited with the conductive block of the positive-electrode unit 60; and a large short-circuit current is generated to cause a phenomenon of fusing and top-cutting at the negative-electrode deformation member 50 and a bottom of the conductive block of the negative-electrode unit 70 so that the negative-electrode deformation member 50 is open-circuited with the conductive block of the negative-electrode unit 70. This can avoid an overcharging and explosion of the energy storage apparatus 100, ensuring the safety and reliability of the energy storage apparatus 100.

Figure 5:
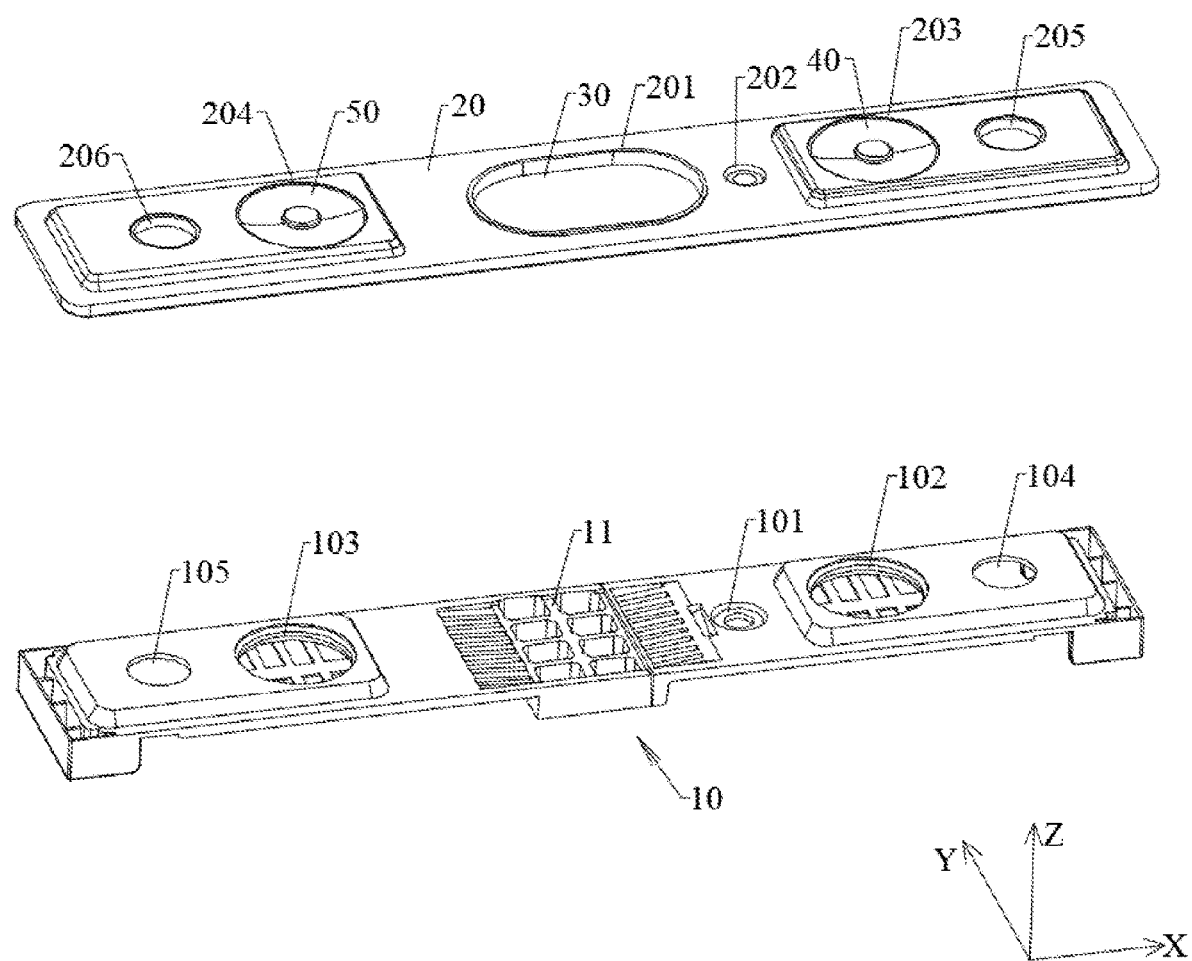
FIG. 5 is a schematic structural view illustrating a lower plastic member, a top cover, an explosion-proof valve, a positive-electrode deformation member, and a negative-electrode deformation member of the end cover assembly illustrated in FIG. 3.

FIG. 5 is a schematic structural view illustrating the lower plastic member 10, the top cover 20, the explosion-proof valve 30, the positive-electrode deformation member 40, and the negative-electrode deformation member 50 of the end cover assembly 120 illustrated in FIG. 3.

The lower plastic member 10 includes an explosion-proof grid 11. The explosion-proof grid 11 extends through a top surface (no reference number is illustrated) of the lower plastic member 10 and a bottom surface (no reference number is illustrated) of the lower plastic member 10. The explosion-proof grid 11 is positioned in the middle of the lower plastic member 10. The lower plastic member 10 defines a first electrolyte injection hole 101, a first avoidance groove 102, a second avoidance groove 103, a third mounting hole 104, and a fourth mounting hole 105. The first electrolyte injection hole 101 extends through the lower plastic member 10 in a thickness direction of the lower plastic member 10 (i.e., the Z-axis direction as illustrated). In an embodiment, the first electrolyte injection hole 101 is positioned in the middle of the lower plastic member 10, is positioned at the right side of the explosion-proof grid 11, and is spaced apart from the explosion-proof grid 11. Exemplarily, the first electrolyte injection hole 101 is a circular hole. In other embodiments, the first electrolyte injection hole 101 may also be a square hole or other irregular holes.

In the X-axis direction, the first avoidance groove 102 and the second avoidance groove 103 are defined at two opposite sides of the explosion-proof grid 11, respectively. The first avoidance groove 102 and the second avoidance groove 103 are both spaced apart from the explosion-proof grid 11. The first avoidance groove 102 is symmetrically defined with the second avoidance groove 103 about the explosion-proof grid 11. In an embodiment, the first avoidance groove 102 is defined at the right side of the explosion-proof grid 11, is positioned at a side of the first electrolyte injection hole 101 facing away from the explosion-proof grid 11, and is spaced apart from the first electrolyte injection hole 101. The second avoidance groove 103 is defined at the left side of the first electrolyte injection hole 101. Both an opening of the first avoidance groove 102 and an opening of the second avoidance groove 103 are defined on the top surface (no reference number is illustrated) of the lower plastic member 10. Both the first avoidance groove 102 and the second avoidance groove 103 are recessed from the top surface of the lower plastic member 10 towards the bottom surface (no reference number is illustrated) of the lower plastic member 10, that is, recessed in the negative direction of the Z-axis as illustrated). Exemplarily, both the first avoidance groove 102 and the second avoidance groove 103 are circular grooves. In other embodiments, the first avoidance groove 102 and the second avoidance groove 103 may also be square grooves or other irregular grooves.

The third mounting hole 104 is defined at a side of the first avoidance groove 102 facing away from the first electrolyte injection hole 101, and is spaced apart from the first avoidance groove 102. The fourth mounting hole 105 is defined at a side of the second avoidance groove 103 facing away from the explosion-proof grid 11, and is spaced apart from the second avoidance groove 103. The third mounting hole 104 is symmetrically defined with the fourth mounting hole 105 about the explosion-proof grid 11. In an embodiment, both the third mounting hole 104 and the fourth mounting hole 105 extend through the lower plastic member 10 in the thickness direction of the lower plastic member 10. Exemplarily, both the third mounting hole 104 and the fourth mounting hole 105 are circular holes, and in other embodiments, the third mounting hole 104 and the fourth mounting hole 105 may also be square holes or other irregular holes.

As illustrated in FIGS. 4 and 5, the top cover 20 defines an explosion-proof hole 201, a second electrolyte injection hole 202, a fitting hole, and a mounting hole. In this embodiment, the explosion-proof hole 201 extends through the top cover 20 in the thickness direction of the top cover 20 (i.e., the Z-axis direction as illustrated). In an embodiment, the explosion-proof holes 201 are defined in the middle of the top cover 20. The explosion-proof hole 201 is in communication with the inside of the energy storage apparatus 100 through the explosion-proof grid 11. Exemplarily, the explosion-proof hole 201 is an oval hole, and the second electrolyte injection hole 202 is a circular hole. In other embodiments, the explosion-proof hole 201 may be a circular hole, a square hole, or other shaped holes.

It may be noted that, terms such as "inside/interior" and "outside/exterior" mentioned herein for describing the end cover assembly 120 in the embodiments of the disclosure are described with reference to the orientations of the energy storage apparatus 100 illustrated in FIG. 1. The term "outside/exterior" refers to a side facing away from the housing 110, and the term "inside/interior" refers to a side facing toward the housing 110. Similar illustrations hereinafter may be interpreted in the same manner.

The second electrolyte injection hole 202 is defined in the middle of the top cover 20, is positioned at the right side of the explosion-proof hole 201, and is spaced apart from the explosion-proof hole 201. In an embodiment, the second electrolyte injection hole 202 extends through the top cover 20 in the thickness direction of the top cover 20. The second electrolyte injection hole 202 is in communication with the first electrolyte injection hole 101 of the lower plastic member 10. The electrolyte may be sequentially injected into the accommodation cavity of the housing 110 (as illustrated in FIG. 1) through the second electrolyte injection hole 202 of the top cover 20 and the first electrolyte injection hole 101 of the lower plastic member 10, thereby achieving injection of the electrolyte into the energy storage apparatus 100. Exemplarily, the second electrolyte injection hole 202 is a circular hole. In other embodiments, the second electrolyte injection hole 202 may be a square hole or other irregular holes.

The fitting hole is defined at an edge of the top cover 20 and is spaced apart from the second electrolyte injection hole 202. In an embodiment, the fitting hole extends through the top cover 20 in the thickness direction of the top cover 20. In the embodiments, two fitting holes are defined and include a first mating hole 203 and a second mating hole 204. In the X-axis direction, the first mating hole 203 and the second mating hole 204 are defined at two opposite sides of the explosion-proof hole 201, respectively. The first mating hole 203 is symmetrically defined with the second mating hole 204 about the explosion-proof hole 201. In an embodiment, the first mating hole 203 is defined at the right side of the explosion-proof hole 201, is positioned at a side of the second electrolyte injection hole 202 facing away from the explosion-proof hole 201, and is spaced apart from the explosion-proof hole 201. The second mating hole 204 is defined at the left side of the first electrolyte injection hole 101. The first mating hole 203 is in communication with the first avoidance groove 102. The second mating hole 204 is in communication with the second avoidance groove 103. Exemplarily, both the first mating hole 203 and the second mating hole 204 are circular holes. In other embodiments, the first mating hole 203 and the second mating hole 204 may also be square holes or other irregular holes.

The mounting hole is positioned at the edge of the top cover 20 and is spaced apart from the fitting hole. In an embodiment, the mounting hole extends through the top cover 20 in the thickness direction of the top cover 20. In the embodiments, two mounting holes are defined and include a first mounting hole 205 and a second mounting hole 206. In the embodiments of the disclosure, the mounting hole may be implemented as at least one of the first mounting hole 205 or the second mounting hole 206. In an embodiment, the first mounting hole 205 is defined at a side of the first mating hole 203 facing away from the second electrolyte injection hole 202, and is spaced apart from the first mating hole 203. The second mounting hole 206 is defined at a side of the second mating hole 204 facing away from the explosion-proof hole 201, and is spaced apart from the second mating hole 204. The first mounting hole 205 is symmetrically defined with the second mounting hole 206 about the explosion-proof hole 201. In addition, the first mounting hole 205 is in communication with the third mounting hole 104 of the lower plastic member 10, and the second mounting hole 206 is in communication with the fourth mounting hole 105 of the lower plastic member 10. Exemplarily, both the first mounting hole 205 and the second mounting hole 206 are circular holes. In some other embodiments, the first mounting hole 205 and the second mounting hole 206 may also be square holes or other irregular holes.

The explosion-proof valve 30 is mounted in the explosion-proof hole 201 and is fixedly connected to a wall of the explosion-proof hole 201. Exemplarily, the explosion-proof valve 30 may be fixedly connected to the wall of the explosion-proof hole 201 by welding, so that the explosion-proof valve 30 is mounted in the explosion-proof hole 201. It may be understood that, the explosion-proof hole 201 is in communication with the inside and the outside of the energy storage apparatus 100; thus when a gas pressure inside the energy storage apparatus 100 is excessively high, the explosion-proof valve 30 will be broken under the effect of the gas pressure, so that gas inside the energy storage apparatus 100 can sequentially pass through the explosion-proof hole 201 and the explosion-proof grid 11 of the lower plastic member 10 and be discharged to the outside of the energy storage apparatus 100 in real time. Therefore, explosion of the energy storage apparatus 100 can be avoided, thereby improving the usage reliability of the energy storage apparatus 100.

The positive-electrode deformation member 40 is mounted in the first mating hole 203 and fixedly connected to a wall of the first mating hole 203. The negative-electrode deformation member 50 is mounted in the second mating hole 204, and is fixedly connected to a wall of the second mating hole 204. The first avoidance groove 102 can avoid collision with the positive-electrode deformation member 40, and the second avoidance groove 103 can avoid collision with the negative-electrode deformation member 50. Exemplarily, the positive-electrode deformation member 40 may be fixedly connected to the wall of the first mating hole 203 by welding, so that the positive-electrode deformation member 40 is mounted in the first mating hole 203. Alternatively or additionally, the negative-electrode deformation member 50 may be fixedly connected to the wall of the second mating hole 204 by welding, so that the negative-electrode deformation member 50 is mounted in the second mating hole 204.

Figure 6:
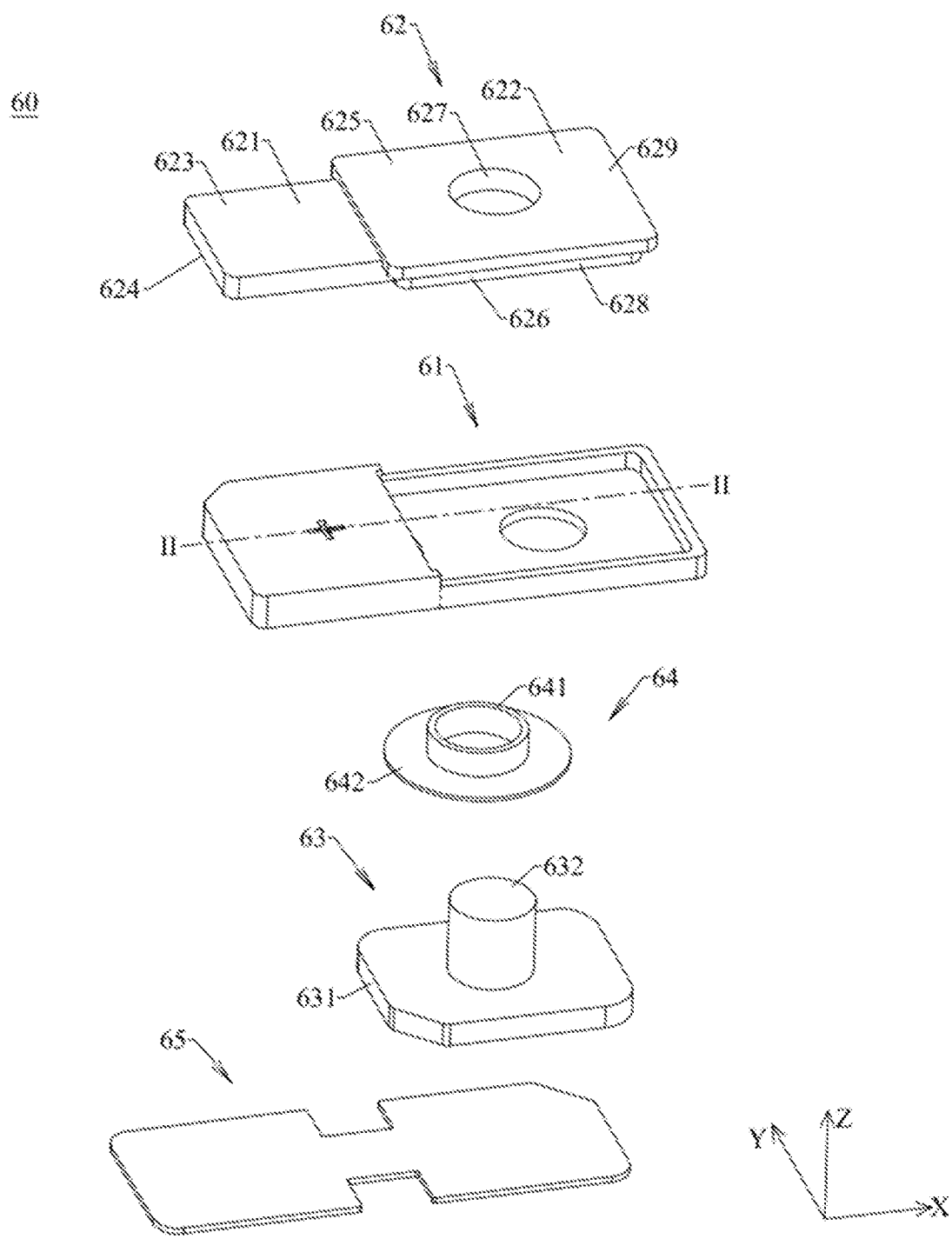
FIG. 6 is a schematic exploded structural view of a positive-electrode unit of the end cover assembly illustrated in FIG. 3.
Figure 7:
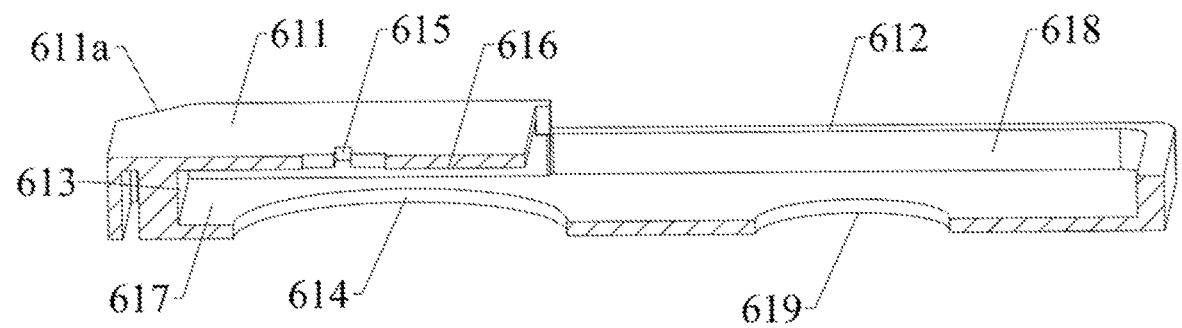
FIG. 7 is a schematic cross-sectional structural view of a first upper plastic member of the positive-electrode unit illustrated in FIG. 6, taken along line II-II.

As illustrated in FIGS. 4, 6, and 7, FIG. 6 is a schematic exploded structural view of the positive-electrode unit 60 of the end cover assembly 120 illustrated in FIG. 3, and FIG. 7 is a schematic sectional structural view of a first upper plastic member 61 of the positive-electrode unit 60 illustrated in FIG. 6, taken along line II-II. In the embodiments of the disclosure, the upper plastic member may be implemented as at least one of the first upper plastic member 61 or a second upper plastic member 71.

The positive-electrode unit 60 includes the first upper plastic member 61, a first conductive block 62, a first terminal post 63, a first sealing member 64, and a first connector 65. The first upper plastic member 61 is mounted to the top cover 20. The first upper plastic member 61 includes a first mounting portion 611 and a first mating portion 612. The first mating portion 612 is fixedly connected to a right side of the first mounting portion 611. The first mounting portion 611 defines a first fitting groove 613, a first avoidance hole 614, and a first identification through-hole 615. An opening of the first fitting groove 613 is defined on a right side surface (no reference number is illustrated) of the first mounting portion 611. The first fitting groove 613 is recessed from the right side surface of the first mounting portion 611 towards a left side surface (no reference number is illustrated) of the first mounting portion 611, that is, is recessed in the negative direction of the X-axis. The first fitting groove 613 has a first groove top surface 616 and a first groove bottom surface 617. In the Z-axis direction, the first groove top surface 616 is spaced apart and is disposed opposite to the first groove bottom surface 617.

An opening of the first avoidance hole 614 is defined on a bottom surface (no reference number is illustrated) of the first mounting portion 611. In an embodiment, the opening of the first avoidance hole 614 is positioned in the middle of the bottom surface of the first mounting portion 611. The first avoidance hole 614 is recessed from the bottom surface of the first mounting portion 611 towards the first fitting groove 613, that is, is recessed in the positive direction of the Z-axis as illustrated. The first avoidance hole 614 extends through the first groove bottom surface 617 of the first fitting groove 613, and is in communication with the first fitting groove 613. The first avoidance hole 614 is disposed opposite to the positive-electrode deformation member 40. Exemplarily, the first avoidance hole 614 is a circular hole. In some other embodiments, the first avoidance hole 614 may also be a square hole or other irregular holes.

An opening of the first identification through-hole 615 is defined on a top surface (no reference number is illustrated) of the first mounting portion 611. In an embodiment, the opening of the first identification through-hole 615 is positioned in the middle of the top surface of the first mounting portion 611. The first identification through-hole 615 is recessed from the top surface of the first mounting portion 611 towards the first fitting groove 613, that is, is recessed in the negative direction of the Z-axis as illustrated. The first identification through-hole 615 extends through the first groove top surface 616 of the first fitting groove 613, and is in communication with the first fitting groove 613. The first identification through-hole 615 is of a cross-shape to identify that the polarity of the positive-electrode unit 60 is positive. In some other embodiments, the first identification through-hole 615 may also be of other shapes, as long as it can identify that the polarity of the positive-electrode unit 60 is positive.

In addition, the first mounting portion 611 includes an identification portion 611a. The identification portion 611a is positioned at an end of the first mounting portion 611 facing away from the first mating portion 612 to identify the polarity of the positive-electrode unit 60. The identification portion 611a may be a chamfer. During assembly of the end cover assembly 120, an operator or an intelligent device can quickly identify the first upper plastic member 61 of the positive-electrode unit 60 according to the identification portion 611a to distinguish the first upper plastic member 61 from the second upper plastic member 71 of the negative-electrode unit 70, thereby improving assembly efficiency. In other words, the identification portion 611a may serve as a fool proof structure of the first upper plastic member 61, preventing an operator from confusing the first upper plastic member 61 of the positive-electrode unit 60 and the second upper plastic member 71 of the negative-electrode unit 70.

The first mating portion 612 defines a first mounting groove 618 and a first through hole 619. An opening of the first mounting groove 618 is defined on a top surface (no reference number is illustrated) of the first mating portion 612. The first mounting groove 618 is recessed from the top surface of the first mating portion 612 towards a bottom surface (no reference number is illustrated) of the first mating portion 612, that is, is recessed in the negative direction of the Z-axis as illustrated. The first mounting groove 618 is in communication with the first fitting groove 613. The first mounting groove 618 has a groove bottom surface (no reference number is illustrated).

The first through hole 619 extends through the first mating portion 612 in a thickness direction of the first mating portion 612. In an embodiment, an opening of the first through hole 619 is defined on the bottom surface of the first mating portion 612. The first through hole 619 is recessed from the bottom surface of the first mating portion 612 towards the first mounting groove 618, that is, is recessed in the positive direction of the Z-axis as illustrated. The first through hole 619 extends through the groove bottom surface of the first mounting groove 618, and is in communication with the first mounting groove 618. The first through hole 619 is in communication with the first mounting hole 205 of the top cover 20. Exemplarily, the first through hole 619 is a circular hole. In some other embodiments, the first through hole 619 may also be a square hole or other irregular holes.

Figure 8:
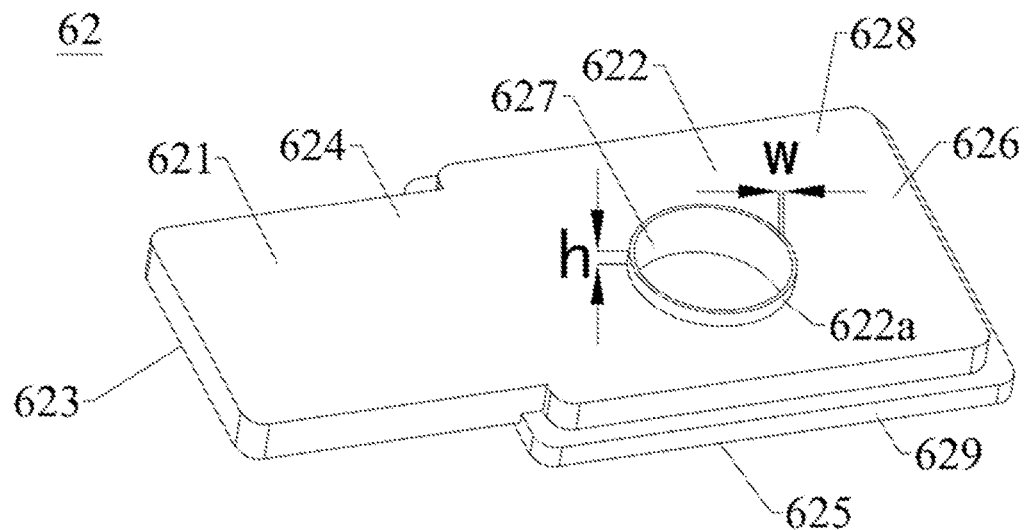
FIG. 8 is a schematic structural view of a first conductive block of the positive-electrode unit illustrated in FIG. 6, viewed from another direction.
Figure 8:
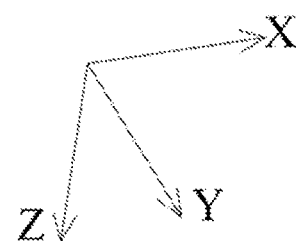

FIG. 8 is a schematic structural view of the first conductive block 62 of the positive-electrode unit 60 illustrated in FIG. 6, viewed from another direction.

The first conductive block 62 is mounted to the first upper plastic member 61. The first conductive block 62 may be made of aluminum. In this embodiment, the first conductive block 62 includes a first extension portion 621 and a first welding portion 622. The first welding portion 622 is fixedly connected to a right side of the first extension portion 621. The first extension portion 621 includes a first top surface 623 and a first bottom surface 624 opposite to the first top surface 623. Exemplarily, both the first top surface 623 and the first bottom surface 624 are flat surfaces.

In an embodiment, the first extension portion 621 is mounted in the first fitting groove 613 and covers the first avoidance hole 614 of the first upper plastic member 61 and the first identification through-hole 615 of the first upper plastic member 61. The first extension portion 621 is in interference fit with the first fitting groove 613. The first top surface 623 of the first extension portion 621 abuts against the first groove top surface 616 of the first fitting groove 613 and covers the first identification through-hole 615 of the first upper plastic member 61. The first bottom surface 624 of the first extension portion 621 abuts against the first groove bottom surface 617 of the first fitting groove 613 and covers the first avoidance hole 614 of the first upper plastic member 61.

In this embodiment, a color of the first extension portion 621 is different from a color of the first mounting portion 611. For example, the first extension portion 621 is in a bright silver color, and the first mounting portion 611 is in a black color. The first top surface 623 of the first extension portion 621 exposes through the first identification through-hole 615, so that a pronounced color contrast is created to form a positive polarity symbol "+", thereby identifying the polarity of the positive-electrode unit 60. Furthermore, the first extension portion 621 is in interference fit with the first fitting groove 613, thus the first top surface 623 of the first extension portion 621 is in close contact with the first groove top surface 616 of the first fitting groove 613 without a gap. This prevents the first identification through-hole 615 from being suspended to form a shadow on the first top surface 623 of the first extension portion 621, thereby improving legibility of the polarity identification.

A thickness of the first welding portion 622 is greater than a thickness of the first extension portion 621. The first welding portion 622 includes a second top surface 625 and a second bottom surface 626 opposite the second top surface 625. The second bottom surface 626 of the first welding portion 622 is flush with the first bottom surface 624 of the first extension portion 621. The second top surface 625 of the first welding portion 622 protrudes relative to the first top surface 623 of the first extension portion 621.

The first welding portion 622 defines a first fitting hole 627. The first fitting hole 627 is positioned in the middle of the first welding portion 622. The first fitting hole 627 extends through the first welding portion 622 in a thickness direction of the first welding portion 622 (i.e., the Z-axis direction as illustrated). Exemplarily, the first fitting hole 627 is a circular hole, and in other embodiments, the first fitting hole 627 may also be a square hole or other irregular holes.

In addition, the first welding portion 622 is provided with a first protruding ring 622a. The first protruding ring 622a is disposed on the first welding portion 622 and surrounds an inner wall of the first fitting hole 627. In an embodiment, the first protruding ring 622a is disposed on the second bottom surface 626 of the first welding portion 622 and protrudes from the second bottom surface 626 of the first welding portion 622 in a direction facing away from the second top surface 625. A bottom surface of the first protruding ring 622a is a flat surface. Exemplarily, the first protruding ring 622a is in an annular shape and is coaxial with the first fitting hole 627. In some other embodiments, the first protruding ring 622a may also be in a rectangular ring shape or other irregular ring shapes.

In this embodiment, a ratio of a thickness w of the first protruding ring 622a to a height h of the first protruding ring 622a ranges from 0.2 to 0.8. This can ensure that the first protruding ring 622a has enough rigidity, so that the first protruding ring 622a can abut against the first upper plastic member 61, thereby tightly pressing the first sealing member 64. In an embodiment, the height h of the first protruding ring 622a ranges from 0.1 mm to 1.2 mm to ensure that the first protruding ring 622a is sufficiently tall to effectively abut against the first upper plastic member 61. The thickness w of the first protruding ring 622a ranges 0.2 mm to 2.4 mm to ensure that the first protruding ring 622a has a sufficient region in contact with the first upper plastic member 61, thereby allowing a more uniform abutment against the first upper plastic member 61.

In an embodiment, the first welding portion 622 is disposed in the first mounting groove 618. The first protruding ring 622a abuts against the first upper plastic member 61. The first fitting hole 627 of the first welding portion 622 is in communication with the first through hole 619 of the first upper plastic member 61. The first protruding ring 622a of the first welding portion 622 abuts against a groove bottom surface of the first mounting groove 618. The second top surface 625 of the first welding portion 622 protrudes relative to the top surface of the first mounting portion 611 of the first upper plastic member 61. A peripheral surface of the first welding portion 622 is spaced apart from a surface of the first mounting portion 611 facing towards the first mating portion 612 (i.e., the right side surface of the first mounting portion 611). It may be understood that, the second top surface 625 of the first welding portion 622 protrudes relative to the top surface of the first mounting portion 611 of the first upper plastic member 61. During welding of a connecting sheet to the second top surface 625 of the first welding portion 622, it can not only prevent the first mounting portion 611 of the first upper plastic member 61 from being scratched by the connecting sheet so that the usage reliability of the energy storage apparatus 100 can be ensured, but also prevent a busbar of the energy storage apparatus 100 from warping during connection of the busbar to a top surface of the first welding portion 622, where warping of the busbar may result in a decrease in electrical connection reliability.

In this embodiment, the first welding portion 622 includes a first fitting portion 628 and a first connecting portion 629. The first connecting portion 629 is disposed on a top side of the first fitting portion 628. The first connecting portion 629 extends outwards relative to a peripheral surface of the first fitting portion 628 to form a protruding ring. A bottom surface of the first fitting portion 628 serves as the second bottom surface 626 of the first welding portion 622. A top surface of the first connecting portion 629 serves as the second top surface 625 of the first welding portion 622. In addition, the first fitting hole 627 extends through the first fitting portion 628 and the first connecting portion 629. The first protruding ring 622a is disposed on a surface of the first fitting portion 628 facing away from the first connecting portion 629 (i.e., the bottom surface of the first fitting portion 628).

In an embodiment, the first fitting portion 628 is disposed in the first mounting groove 618. The first connecting portion 629 protrudes relative to the first mounting groove 618 and abuts against the top surface of the first mating portion 612 of the first upper plastic member 61. A peripheral surface of the first connecting portion 629 is spaced apart from and opposite to the right side surface of the first mounting portion 611 of the first upper plastic member 61. It may be understood that a gap between the right side surface of the first mounting portion 611 of the first upper plastic member 61 and the peripheral surface of the first connecting portion 629 may serve as an error accommodating region. When the first upper plastic member 61 shrinks due to thermal contraction, the first upper plastic member 61 and the first conductive block 62 can still be assembled in place, thereby ensuring the assembling reliability between the first upper plastic member 61 and the first conductive block 62. In some other examples, the first connecting portion 629 may also be flush with the opening of the first mounting groove 618, or the first connecting portion 629 may be recessed relative to the first mounting groove 618.

In addition, the peripheral surface of the first fitting portion 628 is covered by a side wall of the first mounting groove 618. That is, the first mating portion 612 of the first upper plastic member 61 covers the peripheral surface of the first fitting portion 628. A distance between the first connecting portion 629 and the top cover 20 improves the insulation performance between the first connecting portion 629 and the top cover 20, and increases a creep age distance between the first conductive block 62 and the top cover 20, thereby avoiding an arc short circuit between the first conductive block 62 and the top cover 20.

The first terminal post 63 includes a first flange portion 631 and a first post portion 632. The first post portion 632 is disposed on a top side of the first flange portion 631. In an embodiment, the first post portion 632 extends through the third mounting hole 104 of the lower plastic member 10, the first mounting hole 205 of the top cover 20, the first through hole 619 of the first upper plastic member 61, the first protruding ring 622a of the first conductive block 62, and the first fitting hole 627 of the first conductive block 62, and is fixedly connected to the first conductive block 62. The first post portion 632 is fixedly connected to a wall of the first fitting hole 627. Exemplarily, the first post portion 632 may be fixedly connected to the wall of the first fitting hole 627 of the first conductive block 62 by welding. In addition, the first flange portion 631 may be positioned inside the lower plastic member 10, and a top surface of the first flange portion 631 may abut against the lower plastic member 10.

The first sealing member 64 includes a first sealing portion 641 and a first secondary sealing portion 642. The first secondary sealing portion 642 is disposed at a bottom of the first sealing portion 641 and surrounds the first sealing portion 641. In an embodiment, the first sealing member 64 is sleeved on the first post portion 632 of the first terminal post 63 and is clamped between the first post portion 632 and a wall of the first mounting hole 205 of the top cover 20. A top surface (no reference number is illustrated) of the first sealing member 64 abuts against a bottom surface of the first upper plastic member 61. A bottom surface (no reference number is illustrated) of the first sealing member 64 abuts against the top surface of the first flange portion 631 of the first terminal post 63. The first sealing portion 641 of the first sealing member 64 is clamped between the first post portion 632 of the first terminal post 63 and the wall of the first mounting hole 205 of the top cover 20. A surface of the first sealing portion 641 facing away from the first secondary sealing portion 642 (i.e., a top surface of the first sealing portion 641) abuts against the bottom surface of the first upper plastic member 61. A surface of the first secondary sealing portion 642 facing away from the first sealing portion 641 (i.e., a bottom surface of the first secondary sealing portion 642) abuts against the top surface of the first flange portion 631 of the first terminal post 63.

It may be noted that, the first sealing member 64 not only can ensure stability of assembly between the first terminal post 63 and the lower plastic member 10 and stability of assembly between the first terminal post 63 and the top cover 20, but also can prevent the first terminal post 63 from being in direct electrical contact with the top cover 20, thereby realizing insulation between the first terminal post 63 and the top cover 20.

In the embodiments of the disclosure, the first protruding ring 622a of the first conductive block 62 abuts against the first mating portion 612 of the first upper plastic member 61, so that the first mating portion 612 of the first upper plastic member 61 abuts against the top surface of the first sealing member 64, and the first flange portion 631 of the first terminal post 63 abuts against the bottom surface of the first sealing member 64. In this way, the first sealing member 64 is clamped between the first upper plastic member 61 and the first flange portion 631 of the first terminal post 63, thereby ensuring the assembling stability of the first sealing member 64, improving the sealing performance between the first terminal post 63 and the top cover 20, ensuring the sealing performance of the energy storage apparatus 100, and improving the assembly yield of the energy storage apparatus 100.

The first connector 65 is mounted at an inner side of the lower plastic member 10 and positioned at a side of the first flange portion 631 of the first terminal post 63 facing away from the first post portion 632. In an embodiment, one end of the first connector 65 is electrically connected to the first flange portion 631 of the first terminal post 63, and the other end of the first connector 65 is electrically connected to a positive tab of the jelly-roll. Exemplarily, the first connector 65 may be electrically connected to the first flange portion 631 of the first terminal post 63 and/or the positive tab of the jelly-roll by welding.

Figure 9:
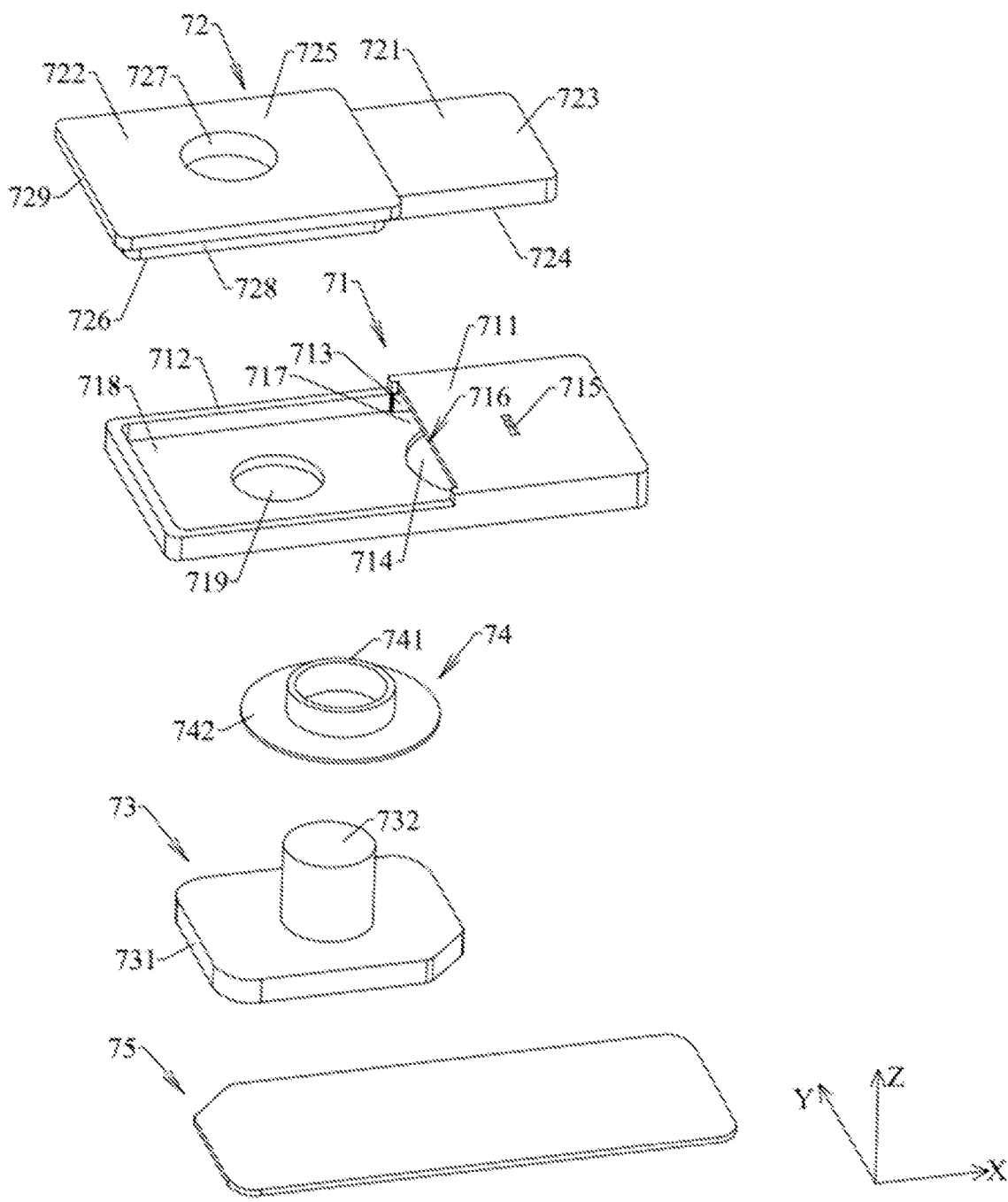
FIG. 9 is a schematic exploded structural view of a negative-electrode unit of the end cover assembly illustrated in FIG. 3.
Figure 10:
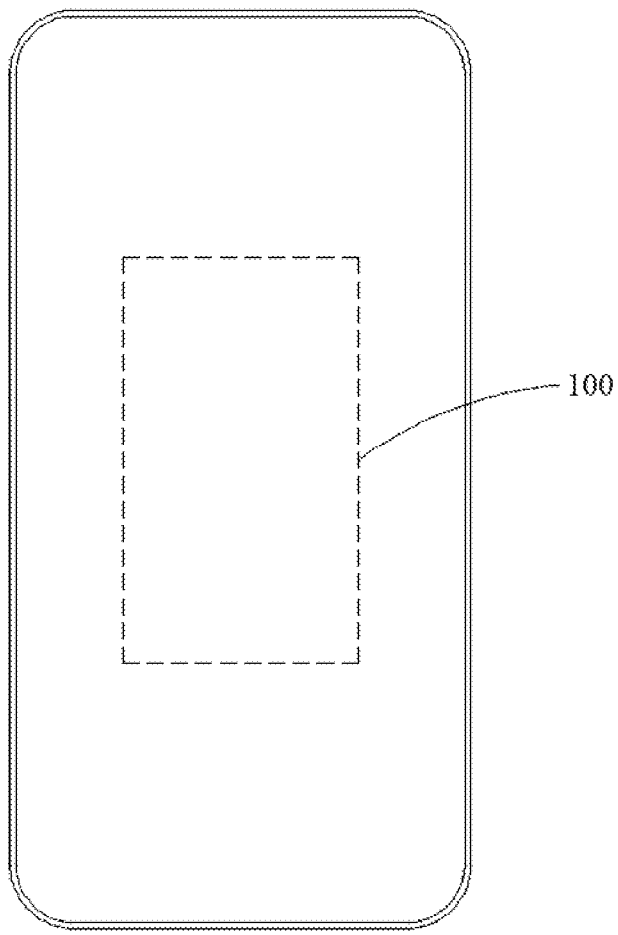
FIG. 10 is a schematic diagram of an electricity-consumption device according to embodiments of the disclosure.
Figure 11:
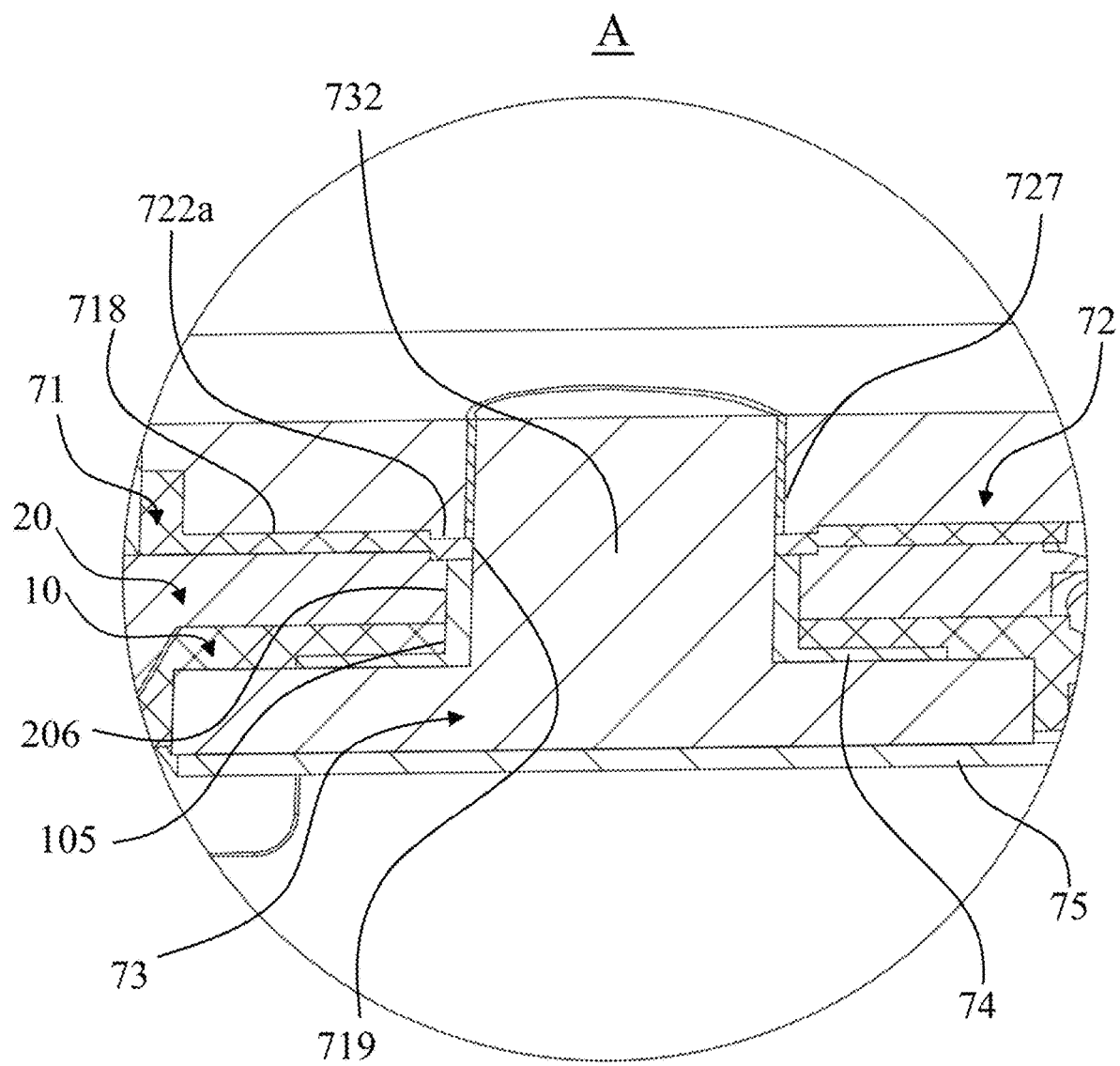
FIG. 11 is an enlarged schematic structural view of Circle A in FIG. 4.
Figure 12:
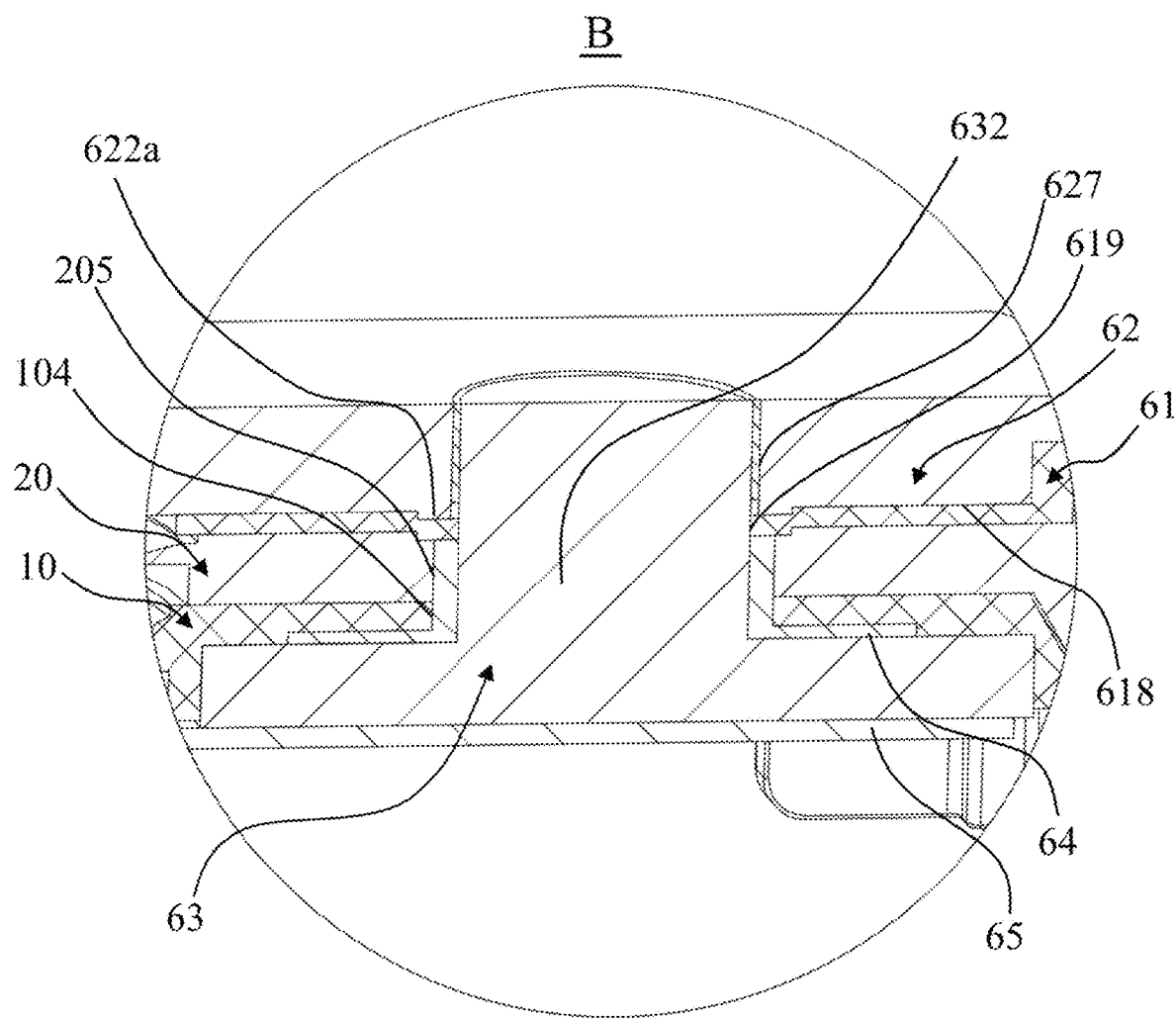
FIG. 12 is an enlarged schematic structural view of Circle B in FIG. 4.

As illustrated in FIGS. 4 and 9, FIG. 9 is a schematic exploded structural view of the negative-electrode unit 70 of the end cover assembly 120 illustrated in FIG. 3.

The negative-electrode unit 70 includes a second upper plastic member 71, a second conductive block 72, a second terminal post 73, a second sealing member 74, and a second connector 75. For a structure of each component in the negative-electrode unit 70, an assembly relationship between a component and another component, an assembly relationship between a component and the lower plastic member 10, and an assembly relationship between a component and the top cover 20, reference may be made to the foregoing relevant illustration of the positive-electrode unit 60, and details are not repeatedly described herein. In the embodiments of the disclosure, the conductive block may be implemented as at least one of the first conductive block 62 or the second conductive block 72. In the embodiments of the disclosure, the terminal post may be implemented as at least one of the first terminal post 63 or the second terminal post 73. In the embodiments of the disclosure, the sealing member may be implemented as at least one of the first sealing member 64 or the second sealing member 74.

The second upper plastic member 71 is mounted at a top side of the top cover 20, is positioned at a left side of the first upper plastic member 61, and is spaced apart from the first upper plastic member 61. The second upper plastic member 71 includes a second mounting portion 711 and a second mating portion 712. The second mating portion 712 is fixedly connected to a left side of the second mounting portion 711. The second mounting portion 711 defines a second fitting groove 713, a second avoidance hole 714, and a second identification through-hole 715. The second mating portion 712 defines a second mounting groove 718 and a second through hole 719. The second through hole 719 is in communication with the second mounting hole 206 of the top cover 20. The second fitting groove 713 has a second groove top surface 716 and a second groove bottom surface 717. The second avoidance hole 714 is disposed opposite to the negative-electrode deformation member 50. The second identification through-hole 715 is in a rectangular shape to identify that the polarity of the negative-electrode unit 70 is negative. In some other embodiments, the second identification through-hole 715 may also of other shapes, as long as the second identification through-hole 715 can identify that the polarity of the negative-electrode unit 70 is negative. In the embodiments of the disclosure, the mounting portion may be implemented as at least one of the first mounting portion 611 or the second mounting portion 711. In the embodiments of the disclosure, the mating portion may be implemented as at least one of the first mating portion 612 or the second mating portion 712. In the embodiments of the disclosure, the fitting groove may be implemented as at least one of the first fitting groove 613 or the second fitting groove 713. In the embodiments of the disclosure, the identification through-hole may be implemented as at least one of the first identification through-hole 615 or the second identification through-hole 715. In the embodiments of the disclosure, the through hole may be implemented as at least one of the first through hole 619 or the second through hole 719. In the embodiments of the disclosure, the mounting groove may be implemented as at least one of the first mounting groove 618 or the second mounting groove 718. In the embodiments of the disclosure, the groove top surface may be implemented as at least one of the first groove top surface 616 or the second groove top surface 716. In the embodiments of the disclosure, the groove bottom surface may be implemented as at least one of the first groove bottom surface 617 or the second groove bottom surface 717.

It may be noted that, in some other embodiments, the second mounting portion 711 may further include an identification portion (not illustrated). The identification portion is configured to identify the polarity of the negative-electrode unit 70. The identification portion of the second mounting portion 711 is different from the identification portion 611a of the first mounting portion 611, so that an operator may distinguish the second upper plastic member 71 of the negative-electrode unit 70 from the first upper plastic member 61 of the positive-electrode unit 60.

The second conductive block 72 is mounted to the second upper plastic member 71. In this embodiment, the second conductive block 72 includes a second extension portion 721 and a second welding portion 722. The second welding portion 722 is fixedly connected to a left side of the second extension portion 721. The second welding portion 722 is provided with a second protruding ring 722a. The second protruding ring 722a is disposed on the second welding portion 722 and surrounds an inner wall of the second fitting hole 727. The second protruding ring 722a is disposed on a fourth bottom surface 726 of the second welding portion 722. The second protruding ring 722a protrudes from the fourth bottom surface 726 of the second welding portion 722 towards a direction facing away from a fourth top surface 725. In the embodiments of the disclosure, the fitting hole may be implemented as at least one of the first fitting hole 627 or the second fitting hole 727. In the embodiments of the disclosure, the protruding ring may be implemented as at least one of the first protruding ring 622a or the second protruding ring 722a. In the embodiments of the disclosure, the extension portion may be implemented as at least one of the first extension portion 621 or the second extension portion 721. In the embodiments of the disclosure, the welding portion may be implemented as at least one of the first welding portion 622 or the second welding portion 722.

In an embodiment, the second extension portion 721 is mounted in the second fitting groove 713. The second welding portion 722 is disposed in the second mounting groove 718. The second fitting hole 727 of the second welding portion 722 is in communication with the second through hole 719 of the second mating portion 712. The second protruding ring 722a of the second welding portion 722 abuts against a groove bottom surface of the second mounting groove 718. The second extension portion 721 is in interference fit with the second fitting groove 713. A third top surface 723 of the second extension portion 721 abuts against the second groove top surface 716 of the second fitting groove 713, and covers the second identification through-hole 715 of the second upper plastic member 71. A third bottom surface 724 of the second extension portion 721 abuts against the second groove bottom surface 717 of the second fitting groove 713, and covers the second avoidance hole 714 of the second upper plastic member 71.

In this embodiment, a color of the second extension portion 721 is different from a color of the second mounting portion 711. For example, the second extension portion 721 is in a bright silver color, and the second mounting portion 711 is in a black color. The third top surface 723 of the second extension portion 721 exposes through the second identification through-hole 715, so that a pronounced color contrast is created to form a negative polarity symbol "−", thereby identifying the polarity of the negative-electrode unit 70. In addition, when the gas pressure inside the energy storage apparatus 100 is excessively high, both the positive-electrode deformation member 40 and the negative-electrode deformation member 50 are driven to flip by the gas pressure. In this way, the positive-electrode deformation member 40 extends through the first avoidance hole 614 and comes into contact with the first welding portion 622 so that the top cover 20 is electrically connected to the first conductive block 62, and the negative-electrode deformation member 50 extends through the second avoidance hole 714 and comes into contact with the second welding portion 722 so that the top cover 20 is electrically connected to the second conductive block 72. As a result, the positive-electrode unit 60 and the negative-electrode unit 70 are conducted to generate a short circuit, rendering the energy storage apparatus 100 unable to operate properly. Therefore, the gas pressure inside the energy storage apparatus 100 cannot be further increased, thereby improving the usage reliability of the energy storage apparatus 100.

In addition, the second welding portion 722 includes a second fitting portion 728 and a second connecting portion 729. The first connecting portion 729 is disposed on a top side of the second fitting portion 728. The second connecting portion 729 extends outwards relative to a peripheral surface of the second fitting portion 728 to form a protruding ring. In an embodiment, the second fitting portion 728 is mounted in the second mounting groove 718, and the second connecting portion 729 protrudes relative to the second mounting groove 718 and abuts against a top surface of the second mating portion 712 of the second upper plastic member 71. The peripheral surface of the second fitting portion 728 is covered by a side wall of the second mounting groove 718. That is, the second mating portion 712 of the second upper plastic member 71 covers the peripheral surface of the second fitting portion 728. A distance between the second connecting portion 729 and the top cover 20 improves the insulation performance between the second connecting portion 729 and the top cover 20, and increases a creep age distance between the second conductive block 72 and the top cover 20, thereby avoiding an arc short circuit between the second conductive block 72 and the top cover 20. In the embodiments of the disclosure, the fitting portion may be implemented as at least one of the first fitting portion 628 or the second fitting portion 728. In the embodiments of the disclosure, the connecting portion may be implemented as at least one of the first connecting portion 629 or the second connecting portion 729.

The second terminal post 73 includes a second flange portion 731 and a second post portion 732. The second post portion 732 is fixedly connected to a top side of the second flange portion 731. In an embodiment, the second post portion 732 extends through the fourth mounting hole 105 of the lower plastic member 10, the second mounting hole 206 of the top cover 20, the second through hole 719 of the second upper plastic member 71, the second protruding ring 722a of the second conductive block 72, and the second fitting hole 727 of the second conductive block 72. The second post portion 732 is fixedly connected to a wall of the second fitting hole 727 of the second conductive block 72. In the embodiments of the disclosure, the flange portion may be implemented as at least one of the first flange portion 631 or the second flange portion 731. In the embodiments of the disclosure, the post portion may be implemented as at least one of the first post portion 632 or the second post portion 732.

The second sealing member 74 includes a second sealing portion 741 and a second secondary sealing portion 742. The second secondary sealing portion 742 is fixedly connected to a bottom of the second sealing portion 741 and surrounds the second sealing portion 741. In an embodiment, a top surface (no reference number is illustrated) of the second sealing portion 741 abuts against a bottom surface of the second upper plastic member 71. A bottom surface (no reference number is illustrated) of the second sealing portion 74 abuts against a top surface of the second flange portion 731 of the second terminal post 73. Part of the second sealing portion 741 is clamped between the second post portion 732 of the second terminal post 73 and a wall of the second mounting hole 206 of the top cover 20. Part of the second sealing portion 741 is clamped between the second post portion 732 of the second terminal post 73 and a wall of the fourth mounting hole 105 of the lower plastic member 10. In the embodiments of the disclosure, the sealing portion may be implemented as at least one of the first sealing portion 641 or the second sealing portion 741. In the embodiments of the disclosure, the secondary sealing portion may be implemented as at least one of the first secondary sealing portion 642 or the second secondary sealing portion 742.

The second connector 75 is mounted at an inner side of the lower plastic member 10 and positioned at a side of the second flange portion 731 of the second terminal post 73 facing away from the second post portion 732. In an embodiment, one end of the second connector 75 is electrically connected to the second flange portion 731 of the second terminal post 73, and the other end of the second connector 75 is electrically connected to a negative tab of the jelly-roll. Exemplarily, the second connector 75 may be electrically connected to the second flange portion 731 of the second terminal post 73 and/or the positive tab of the jelly-roll by welding.

In the embodiments of the disclosure, the protruding ring of the conductive block abuts against the upper plastic member, so that the upper plastic member abuts against the top surface of the sealing member. The flange portion of the terminal post abuts against the bottom surface of the sealing member. As such, the sealing member is clamped between the upper plastic member and the terminal post. In this way, the assembly stability of the sealing member is ensured, the sealing performance between the terminal post and the top cover is enhanced, and the sealing performance of the jelly-roll is ensured.

It may be understood that, the energy storage apparatus 100 may also be an apparatus that has a function of storing power, such as a battery module, a battery pack, or a battery system. For example, the energy storage apparatus 100 is a battery pack. The energy storage apparatus 100 includes multiple jelly-rolls and multiple connecting sheets. Each connecting sheet is electrically connected between two jelly-rolls. The jelly-roll may have structures illustrated in the energy storage apparatus 100 described in the above embodiments. In this case, the multiple jelly-rolls may be connected in series, one end of each connection sheet is electrically connected to a positive electrode assembly of one jelly-roll, and another end of each connection sheet is electrically connected to a negative electrode assembly of another jelly-roll. Alternatively, the multiple jelly-rolls may also be connected in parallel, part of the connecting sheets is electrically connected between the positive electrode assemblies of the two jelly-rolls, and part of the connecting sheets is electrically connected between the negative electrode assemblies of the two jelly-rolls. Exemplarily, the connecting sheet may be an aluminum bar. It may be noted that, part of the jelly-rolls may also be arranged in series, and part of the jelly-rolls may be arranged in parallel. The embodiments of the disclosure do not specifically limit a connection manner of the multiple jelly-rolls in the battery pack.

An electricity-consumption device is further provided in the disclosure. The electricity-consumption device includes the energy storage apparatus 100. The energy storage apparatus 100 is configured to power the electricity-consumption device. The electricity-consumption device may be a new energy vehicle (e.g., hybrid or electric vehicle), an electricity storage station, a server, and other devices requiring electricity.

The above illustrations are merely specific embodiments of the disclosure, but are not intended to limit the scope of protection of the disclosure. Any variation or replacement readily figured out by a person skilled in the art within the technical scope disclosed in the disclosure shall belong to the scope of protection of the disclosure. Without conflict, the embodiments of the disclosure and the features in the embodiments can be combined with each other. Therefore, the scope of protection of the disclosure shall be subject to the scope of protection of the claims.

What is claimed is:

1. An end cover assembly applicable to an energy storage apparatus and comprising:
    a top cover, wherein the top cover defines a mounting hole, and the mounting hole extends through the top cover in a thickness direction of the top cover;
    an upper plastic member mounted on the top cover, wherein the upper plastic member comprises a mounting portion and a mating portion, the mating portion is fixedly connected to one side of the mounting portion, the mounting portion defines a fitting groove and an identification through-hole, the identification through-hole is in communication with the fitting groove, and the mating portion defines a through hole extending through the upper plastic member in a thickness direction of the mating portion and being in communication with the mounting hole;
    a conductive block mounted on the upper plastic member, wherein: the conductive block comprises an extension portion and a welding portion, the welding portion is fixedly connected to one side of the extension portion, the extension portion is mounted in the fitting groove, a top surface of the extension portion covers the identification through-hole, the welding portion defines a fitting hole, the fitting hole extends through the welding portion in a thickness direction of the welding portion and is in communication with the through hole, the welding portion comprises a protruding ring, the protruding ring is disposed on the welding portion and surrounds an inner wall of the fitting hole, and the protruding ring is in contact with and abuts against the upper plastic member after assembly;
    a terminal post comprising a flange portion and a post portion, wherein the post portion is disposed on a top side of the flange portion, and the post portion extends through the mounting hole, the through hole, and the fitting hole and is fixedly connected to the conductive block; and
    a sealing member sleeved on the post portion and clamped between the post portion and a wall of the mounting hole, wherein a top surface of the sealing member abuts against a bottom surface of the upper plastic member, and a bottom surface of the sealing member abuts against a top surface of the flange portion,
    wherein the protruding ring is coaxial with the fitting hole of the welding portion and abuts against a bottom surface of a mounting groove of the upper plastic member; and
    wherein the post portion of the terminal post extends through a mounting hole of the lower plastic member, the mounting hole of the top cover, the through hole of the mating portion of the upper plastic member, the protruding ring of the welding portion of the conductive block, and the fitting hole of the welding portion of the conductive block.

2. The end cover assembly of claim 1, wherein a ratio of a thickness of the protruding ring to a height of the protruding ring ranges from 0.2 to 0.8.

3. The end cover assembly of claim 1, wherein a height of the protruding ring ranges from 0.1 mm to 1.2 mm.

4. The end cover assembly of claim 1, wherein a thickness of the protruding ring ranges from 0.2 mm to 2.4 mm.

5. The end cover assembly of claim 1, wherein the sealing member comprises a sealing portion and a secondary sealing portion, wherein the secondary sealing portion is positioned on a bottom of the sealing portion and surrounds the sealing portion, and the sealing portion is sleeved on the post portion and clamped between the post portion and the wall of the mounting hole;
    wherein a surface of the sealing portion that faces away from the secondary sealing portion abuts against the bottom surface of the upper plastic member, and a surface of the secondary sealing portion that faces away from the sealing portion abuts against the top surface of the flange portion.

6. The end cover assembly of claim 1, wherein the conductive block comprises a fitting portion and a connecting portion, wherein the connecting portion is disposed on a top side of the fitting portion and extends outwards relative to a peripheral surface of the fitting portion to form the protruding ring, and the upper plastic member covers the peripheral surface of the fitting portion.

7. The end cover assembly of claim 6, wherein the fitting portion is received in the mounting groove, the welding portion comprises the fitting portion and the connecting portion, and the welding portion is received in the mounting groove.

8. The end cover assembly of claim 7, wherein the fitting groove comprises a groove top surface and a groove bottom surface opposite the groove top surface, the top surface of the extension portion abuts against the groove top surface, and a bottom surface of the extension portion abuts against the groove bottom surface.

9. The end cover assembly of claim 1, wherein the extension portion is in interference fit with the fitting groove, and the top surface of the extension portion abuts against a groove top surface of the fitting groove.

10. The end cover assembly of claim 1, wherein the post portion is fixedly connected to the inner wall of the fitting hole of the welding portion of the conductive block by welding.

11. An energy storage apparatus, comprising a housing and an end cover assembly, the end cover assembly being mounted on a top side of the housing, wherein the end cover assembly comprises:
    a top cover, wherein the top cover defines a mounting hole, and the mounting hole extends through the top cover in a thickness direction of the top cover;
    an upper plastic member mounted on the top cover, wherein the upper plastic member comprises a mounting portion and a mating portion, the mating portion is fixedly connected to one side of the mounting portion, the mounting portion defines a fitting groove and an identification through-hole, the identification through-hole is in communication with the fitting groove, and the mating portion defines a through hole extending through the upper plastic member in a thickness direction of the mating portion and being in communication with the mounting hole;
    a conductive block mounted on the upper plastic member, wherein the conductive block comprises an extension portion and a welding portion, the welding portion is fixedly connected to one side of the extension portion, the extension portion is mounted in the fitting groove, a top surface of the extension portion covers the identification through-hole, the welding portion defines a fitting hole, the fitting hole extends through the welding portion in a thickness direction of the welding portion and is in communication with the through hole, the welding portion comprises a protruding ring, the protruding ring is disposed on the welding portion and surrounds an inner wall of the fitting hole, and the protruding ring is in contact with and abuts against the upper plastic member after assembly;

a terminal post comprising a flange portion and a post portion, wherein the post portion is disposed on a top side of the flange portion, and the post portion extends through the mounting hole, the through hole, and the fitting hole and is fixedly connected to the conductive block; and a sealing member sleeved on the post portion and clamped between the post portion and a wall of the mounting hole, wherein a top surface of the sealing member abuts against a bottom surface of the upper plastic member, and a bottom surface of the sealing member abuts against a top surface of the flange portion, wherein the protruding ring is coaxial with the fitting hole of the welding portion and abuts against a bottom surface of the mounting groove of the upper plastic member; and wherein the post portion of the terminal post extends through a mounting hole of the lower plastic member, the mounting hole of the top cover, the through hole of the mating portion of the upper plastic member, the protruding ring of the welding portion of the conductive block, and the fitting hole of the welding portion of the conductive block.

12. The energy storage apparatus of claim 11, wherein a ratio of a thickness of the protruding ring to a height of the protruding ring ranges from 0.2 to 0.8.

13. The energy storage apparatus of claim 11, wherein a height of the protruding ring ranges from 0.1 mm to 1.2 mm.

14. The energy storage apparatus of claim 11, wherein a thickness of the protruding ring ranges from 0.2 mm to 2.4 mm.

15. The energy storage apparatus of claim 11, wherein the sealing member comprises a sealing portion and a secondary sealing portion, wherein the secondary sealing portion is positioned on a bottom of the sealing portion and surrounds the sealing portion, and the sealing portion is sleeved on the post portion and clamped between the post portion and the wall of the mounting hole;

wherein a surface of the sealing portion that faces away from the secondary sealing portion abuts against the bottom surface of the upper plastic member, and a surface of the secondary sealing portion that faces away from the sealing portion abuts against the top surface of the flange portion.

16. The energy storage apparatus of claim 11, wherein the conductive block comprises a fitting portion and a connecting portion, wherein the connecting portion is disposed on a top side of the fitting portion and extends outwards relative to a peripheral surface of the fitting portion to form the protruding ring, and the upper plastic member covers the peripheral surface of the fitting portion.

17. The energy storage apparatus of claim 16, wherein the upper plastic member defines a mounting groove, and the fitting portion is received in the mounting groove.

18. The energy storage apparatus of claim 17, wherein the through hole is in communication with the mounting groove, the fitting hole extends through the fitting portion and the connecting portion, and the protruding ring is disposed on a surface of the fitting portion away from the connecting portion.

19. The energy storage apparatus of claim 17, wherein the welding portion comprises the fitting portion and the connecting portion, and the welding portion is received in the mounting groove.

20. An electricity-consumption device, comprising an energy storage apparatus, the energy storage apparatus being configured to power the electricity-consumption device and comprising a housing and an end cover assembly, the end cover assembly being mounted on a top side of the housing, wherein the end cover assembly comprises:

a top cover, wherein the top cover defines a mounting hole, and the mounting hole extends through the top cover in a thickness direction of the top cover;

an upper plastic member mounted on the top cover, wherein the upper plastic member comprises a mounting portion and a mating portion, the mating portion is fixedly connected to one side of the mounting portion, the mounting portion defines a fitting groove and an identification through-hole, the identification through-hole is in communication with the fitting groove, and the mating portion defines a through hole extending through the upper plastic member in a thickness direction of the mating portion and being in communication with the mounting hole;

a conductive block mounted on the upper plastic member, wherein the conductive block comprises an extension portion and a welding portion, the welding portion is fixedly connected to one side of the extension portion, the extension portion is mounted in the fitting groove, a top surface of the extension portion covers the identification through-hole, the welding portion defines a fitting hole, the fitting hole extends through the welding portion in a thickness direction of the welding portion and is in communication with the through hole, the welding portion comprises a protruding ring, the protruding ring is disposed on the welding portion and surrounds an inner wall of the fitting hole, and the protruding ring abuts is in contact with and against the upper plastic member after assembly;

a terminal post comprising a flange portion and a post portion, wherein the post portion is disposed on a top side of the flange portion, and the post portion extends through the mounting hole, the through hole, and the fitting hole and is fixedly connected to the conductive block; and a sealing member sleeved on the post portion and clamped between the post portion and a wall of the mounting hole, wherein a top surface of the sealing member abuts against a bottom surface of the upper plastic member, and a bottom surface of the sealing member abuts against a top surface of the flange portion, wherein the protruding ring is coaxial with the fitting hole of the welding portion and abuts against a bottom surface of the mounting groove of the upper plastic member; and wherein the post portion of the terminal post extends through a mounting hole of the lower plastic member, the mounting hole of the top cover, the through hole of the mating portion of the upper plastic member, the protruding ring of the welding portion of the conductive block, and the fitting hole of the welding portion of the conductive block.

* * * * *